US012473010B2

United States Patent
Born et al.

(10) Patent No.: US 12,473,010 B2
(45) Date of Patent: Nov. 18, 2025

(54) STEERING DEVICE, MOTOR VEHICLE HAVING SUCH A STEERING DEVICE, AND METHOD FOR OPERATING SUCH A STEERING DEVICE

(71) Applicant: Mercedes-Benz Group AG, Stuttgart (DE)

(72) Inventors: Christian Born, Hamburg (DE); Karsten Braeuer, Tostedt (DE); Axel Hebenstreit, Stuttgart (DE); Peter Schmidt, Berlin (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/708,384

(22) PCT Filed: Oct. 13, 2022

(86) PCT No.: PCT/EP2022/078518
§ 371 (c)(1),
(2) Date: May 8, 2024

(87) PCT Pub. No.: WO2023/083554
PCT Pub. Date: May 19, 2023

(65) Prior Publication Data
US 2025/0010907 A1 Jan. 9, 2025

(30) Foreign Application Priority Data
Nov. 9, 2021 (DE) .................... 10 2021 005 526.8

(51) Int. Cl.
| | |
|---|---|
| *B60R 25/021* | (2013.01) |
| *B62D 1/16* | (2006.01) |
| *B62D 5/00* | (2006.01) |
| *B62D 5/04* | (2006.01) |

(52) U.S. Cl.
CPC ............... *B62D 5/001* (2013.01); *B62D 1/16* (2013.01)

(58) Field of Classification Search
CPC ....... B60R 25/00; B60R 25/02; B60R 25/021; B62D 1/16; B62D 5/001; B62D 5/04
(Continued)

(56) References Cited

U.S. PATENT DOCUMENTS

2014/0249719 A1 9/2014 Gauch et al.
2022/0402541 A1* 12/2022 Yeom ..................... B62D 5/001

FOREIGN PATENT DOCUMENTS

| CN | 104245438 A | * 12/2014 | ......... B60R 25/0211 |
| CN | 116062021 A | * 5/2023 | ............... B62D 1/16 |

(Continued)

OTHER PUBLICATIONS

Description translation for DE 102019113232 from Espacenet (Year: 2019).*

(Continued)

*Primary Examiner* — Jason D Shanske
*Assistant Examiner* — Daniel M. Keck
(74) *Attorney, Agent, or Firm* — Crowell & Moring LLP

(57) ABSTRACT

A steering device which is configured as a steer-by-wire steering device includes a steering shaft disposed for rotation in a circumferential direction, a casing tube at least partially encompassing the steering shaft where the steering shaft is fixed in relation to the casing tube in an axial direction of the steering shaft, a sleeve encompassing the steering shaft, and a locking device. The steering shaft has an external thread which meshes with an internal thread of the sleeve. The sleeve is form-fitted into the casing tube such that the sleeve is displaceable in relation to the casing tube in the axial direction and is fixed in the circumferential direction. A lateral surface of the sleeve has a recess. The (Continued)

locking device and the recess are disposed such that the locking device is engageable into the recess in an axial position of the sleeve.

9 Claims, 2 Drawing Sheets

(58) Field of Classification Search
USPC .......................................................... 74/492
See application file for complete search history.

(56) References Cited

FOREIGN PATENT DOCUMENTS

| CN | 116829456 A | * | 9/2023 | |
|----|----|----|----|----|
| DE | 102012003254 A1 | * | 8/2013 | ........... B60R 25/021 |
| DE | 102019113232 A1 | * | 9/2020 | |
| DE | 11 2020 005 479 T5 | | 11/2022 | |
| GB | 2498081 A | * | 7/2013 | ............... B62D 1/16 |
| KR | 10-2018-0028235 A | | 3/2018 | |
| WO | WO 2020/256426 A1 | | 12/2020 | |
| WO | WO 2021/091194 A1 | | 5/2021 | |

OTHER PUBLICATIONS

Description Translation for DE 102012003254 from Espacenet (Year: 2012).*
International Search Report (PCT/ISA/210) issued in PCT Application No. PCT/EP2022/078518 dated Jan. 5, 2023 (2 pages).
German-language German Office Action issued in German Application No. 10 2021 005 526.8 dated Mar. 1, 2022 (7 pages).

* cited by examiner

STEERING DEVICE, MOTOR VEHICLE HAVING SUCH A STEERING DEVICE, AND METHOD FOR OPERATING SUCH A STEERING DEVICE

BACKGROUND AND SUMMARY OF THE INVENTION

The invention relates to a steering device, a motor vehicle having such a steering device and a method for operating such a steering device.

Steering devices which are designed as steer-by-wire steering devices are known, in which, because of the mechanical design, a force-free rotation of a steering wheel having the steering device is possible in some situations, in particular in a parking position of a motor vehicle having the steering device.

A mechanical steering stop, which is realized in conventional steering devices in particular in a steering gear, cannot be used with steer-by-wire steering devices in this form, as mechanical and electronic components at the end of the steering device near the steering wheel are not protected any more by a mechanical limit.

Furthermore, steering devices which are designed as steer-by-wire steering devices and have an electronic steering stop are known. A disadvantage of these is that the electronic steering stop can be overcome with a corresponding application of force.

Furthermore, steering devices which are designed as steer-by-wire steering devices and have a series connection of a plurality of mechanical steering stops are known. A disadvantage of these steering devices is that they are complex and expensive and the force-free rotation cannot be prevented in the parking position.

KR 1020180028235 A refers to a steering wheel rotation limiting device which can limit the rotation angle of the steering wheel to a certain angle, and due to external conditions, such as a situation in which the front wheel remains hanging on the curb, the steering of the front wheel is affected by resistance at any rotation angle of the steering wheel, for example. In relation to a steering wheel rotation limiting device, it is capable of instantly restricting the rotation of the steering wheel to match the limited rotation angle. The document further relates to a rotation limiting device of a steering wheel which is installed in a steering reaction force device of a steer-by-wire system. It further shows a method comprising: a steering shaft on which the steering wheel is installed; a housing having a hollow section through which the steering shaft extends; a stopper which is arranged inside of the housing in order to limit the rotation angle of the steering wheel to a predetermined angle. The steering shaft is arranged on the outer side of the housing. A locking unit for restricting the rotation of the steering wheel is possible at any rotation angle of the steering wheel.

WO 2020256426 A1 discloses a device with which it is possible to provide a steering device of the steer-by-wire type, which device: limits a steering wheel actuation performed by a driver to within a maximum rotation angle, whereby the steering feel is increased for the driver; and prevents a clock spring installed on a steering wheel from being damaged; and enables parts to be produced and processed more easily. The device enables easy assembly; has low interference with surrounding parts. Thus, the device can be developed in different structures and is advantageous in terms of packaging.

The invention is based on the object of creating a motor vehicle having such a steering device and a method for operating such a steering device, wherein the aforementioned disadvantages are at least partially resolved, preferably avoided.

The object is solved by providing the present technical teaching, in particular the teaching of the independent claims and of the embodiments disclosed in the dependent claims and the description.

The object is solved in particular by creating a steering device which is designed as a steer-by-wire steering device. The steering device has a steering shaft arranged for rotation in the circumferential direction, a casing tube at least partially encompassing the steering shaft in the circumferential direction, a sleeve encompassing the steering shaft in the circumferential direction, and a locking device. The steering shaft is fixed in relation to the casing tube in an axial direction of the steering shaft. Furthermore, the steering shaft has an external thread which meshes with an internal thread of the sleeve, wherein the sleeve is form-fitted into the casing tube such that the sleeve can be displaced in relation to the casing tube in the axial direction and is fixed in the circumferential direction. The lateral surface of the sleeve has at least one recess, wherein the locking device and the at least one recess are arranged in relation to each other in such a way that the locking device can engage into the at least one recess in at least one axial position of the sleeve.

Advantageously, it is therefore possible to mechanically block the steering shaft, in particular in a parking position, by means of the engagement of the locking device into the at least one recess and thus to prevent a force-free rotation of the steering shaft.

Advantageously, the steering device can thus be designed in a more space-saving manner. Furthermore, there is no need for expensive gear units to block rotation of the steering shaft in the parking position.

Preferably, the lateral surface of the sleeve has a plurality of recesses, particularly preferably three recesses, wherein the locking device and the plurality of recesses are arranged in relation to each other in such a way that the locking device can engage into one recess of the plurality of recesses in at least one axial position of the sleeve. In particular, in each case two recesses of the plurality of recesses are axially spaced apart from each other. In addition, preferably at least two recesses of the plurality of recesses are identical.

Preferably, the pitch of the internal thread and/or the external thread is from 2 mm to 10 mm, particularly preferably 5 mm.

According to a development of the invention, it is provided that the sleeve can be displaced between a first end position and a second end position in the axial direction of the steering shaft. Therefore, preferably there is a zero-position located between the first end position and the second end position. In particular, the steering device is designed such that the wheels that can be actuated by means of the steering device do not have a steering lock in the zero-position. Furthermore, a distance between the zero-position and the first end position along a displacement distance is preferably from 6 mm to 7 mm, preferably from 6.2 mm to 6.7 mm. Alternatively or additionally, the sleeve can preferably be displaced from the zero-position into the first end position by means of a rotation of the steering shaft through a rotation angle of from 400° to 500°, preferably from 440° to 480°. Alternatively or additionally, a distance between the zero-position and the second end position along a displacement distance is preferably from 6 mm to 7 mm, preferably from 6.2 mm to 6.7 mm. Alternatively or additionally, the sleeve can preferably be displaced from the zero-position into the second end position by means of a rotation of the steering shaft through a rotation angle of from 400° to 500°, preferably from 440° to 480°. Preferably, the steering shaft is displaced from the zero-position into the first end position upon rotation in the clockwise direction and from the zero-position into the second end position upon rotation in the anti-clockwise direction. Alternatively, the steering shaft is preferably displaced from the zero-position into the second end position upon rotation in the clockwise direction and from the zero-position into the first end position upon rotation in the anti-clockwise direction.

Particularly preferably, the pitch of the internal thread and/or of the external thread is designed such that the distance between the zero-position and the first end position is from 6 mm to 7 mm, particularly preferably from 6.2 mm to 6.7 mm, and the steering shaft is rotated through a rotation angle of from 400° to 500°, particularly preferably from 440° to 480°, in order to displace the sleeve from the zero-position into the first end position. Alternatively or additionally, particularly preferably the pitch of the internal thread and/or of the external thread is designed such that the distance between the zero-position and the second end position is from 6 mm to 7 mm, particularly preferably from 6.2 mm to 6.7 mm, and the steering shaft is rotated through a rotation angle of from 400° to 500°, particularly preferably from 440° to 480°, in order to displace the sleeve from the zero-position into the second end position.

According to a development of the invention, it is provided that the at least one recess is formed in a bottom surface of a cavity—as a subarea of the lateral surface—of the sleeve. The cavity has a first abutment surface and a second abutment surface in the axial direction of the steering shaft. Additionally, a housing encompassing the locking device engages into the cavity in such a way that the housing, in connection with the first abutment surface and the second abutment surface, limits the displacement of the sleeve along the axial direction of the steering shaft.

Advantageously, the steering stop, in particular a steering angle range of the steering shaft, is mechanically limited by means of the cavity.

Preferably, the cavity has a length in the axial direction of the steering shaft which matches the sum of the displacement distance from the zero-position to the first end position, in particular from 6 mm to 7 mm, preferably from 6.2 mm to 6.7 mm, the displacement distance from the zero-position to the second end position, in particular from 6 mm to 7 mm, preferably from 6.2 mm to 6.7 mm, and an extent of the housing encompassing the locking device in the axial direction of the steering shaft.

According to a development of the invention, it is provided that the locking device has a bolt. The bolt of the locking device is designed to engage into the at least one recess. Preferably, the bolt of the locking device is designed to be able to engage into each recess of the plurality of recesses.

Advantageously, this enables the steering shaft to be easily blocked, in particular in the parking position.

According to a development of the invention, it is provided that the bolt of the locking device is pretensioned into a locked state and can be displaced into a released state by means of an actuator, in particular an electric motor, counter to the pretension, which in particular is generated by a spring.

In the context of the present technical teaching, in the locked state the bolt of the locking device engages into the at least one recess and thus blocks a rotation of the steering shaft around the axial direction of the steering shaft.

In the context of the present technical teaching, in the released state the bolt of the locking device does not engage into the at least one recess. Thus, the steering shaft can be rotated around the axial direction of the steering shaft.

According to a development of the invention, it is provided that the sleeve engages into the casing tube in a form-fitting manner by means of at least one radial elevation.

According to a development of the invention, it is provided that the at least one radial elevation has the cavity.

Advantageously, the mechanical steering stop, the mechanical blocking of the steering shaft and the mechanical fixing of the sleeve in the circumferential direction can be achieved together in a simple manner.

According to a development of the invention, it is provided that the steering device has a steering sensor. The steering sensor is designed to determine a functioning state of the bolt, chosen from the released state, a waiting state and the locked state. The bolt cannot block a rotation of the steering shaft in the released state. Preferably, the bolt is arranged outside of the cavity in the released state. This is not mandatory, however. What is important is that the bolt is held in the released state by the actuator against the pretension. The bolt is pretensioned in particular against the bottom surface of the cavity—and not held by the actuator—in the waiting state in order to engage into a recess of the at least one recess once it overlaps the recess by rotation of the steering shaft and displacing the sleeve. The bolt engages into a recess of the at least one recess in the locked state.

In the context of the present technical teaching, in the waiting state the bolt of the locking device does not engage into the at least one recess. Thus, the steering shaft can be rotated around the axial direction of the steering shaft. However, the bolt in the waiting state is designed in such a way that the bolt is pushed into the at least one recess upon rotation of the steering shaft.

In particular, in the released state, the bolt is displaced counter to a pretension, wherein this displacement can preferably be achieved by means of activating an actuator, in particular an electric motor. Additionally, the actuator is not activated in the waiting and locked state. Thus, it can be determined in a simple manner, in particular by using the actuator, if the bolt is located in the released state or not.

The object is also solved by creating a motor vehicle having a steering device according to the invention or a steering device according to one or more of the embodiments described above. In conjunction with the motor vehicle, the advantages which have already been explained in conjunction with the steering device arise in particular.

In a preferred embodiment, the steering device of the motor vehicle has the steering sensor. The steering sensor is operatively connected to the steering shaft and the locking device, in particular.

In an advantageous embodiment, the motor vehicle is designed as a passenger car. It is also possible, however, that the motor vehicle is a heavy goods vehicle, a commercial vehicle or another motor vehicle.

The object is also solved by creating a method for operating a steering device according to the invention or a steering device according to one or more of the embodiments described above. In this case, the steering sensor is operatively connected to the steering shaft and the locking device. A functioning state of the bolt, chosen from a group consisting of the released state, the waiting state and the locked state, is determined by means of the steering sensor.

If the bolt is in the waiting state, the steering shaft is rotated—in particular automatically—until the bolt is pushed into the locked state, in particular by the pretension. In conjunction with the method, the advantages which have already been explained in conjunction with the steering device and the motor vehicle arise in particular.

Preferably, the method is carried out by means of a control device, wherein the control device is operatively connected in particular to the steering sensor, the steering shaft and the locking device and is set up for their respective control. Particularly preferably, the steering shaft is automatically rotated by a motor which is controlled in particular by the control device.

Furthermore, it is advantageously possible by means of the method to block the steering shaft, in particular in a parking position, and thus to prevent force-free rotation of the steering shaft.

The invention is explained in more detail in the following using the drawings.

DETAILED DESCRIPTION OF THE DRAWINGS

Figure 1:
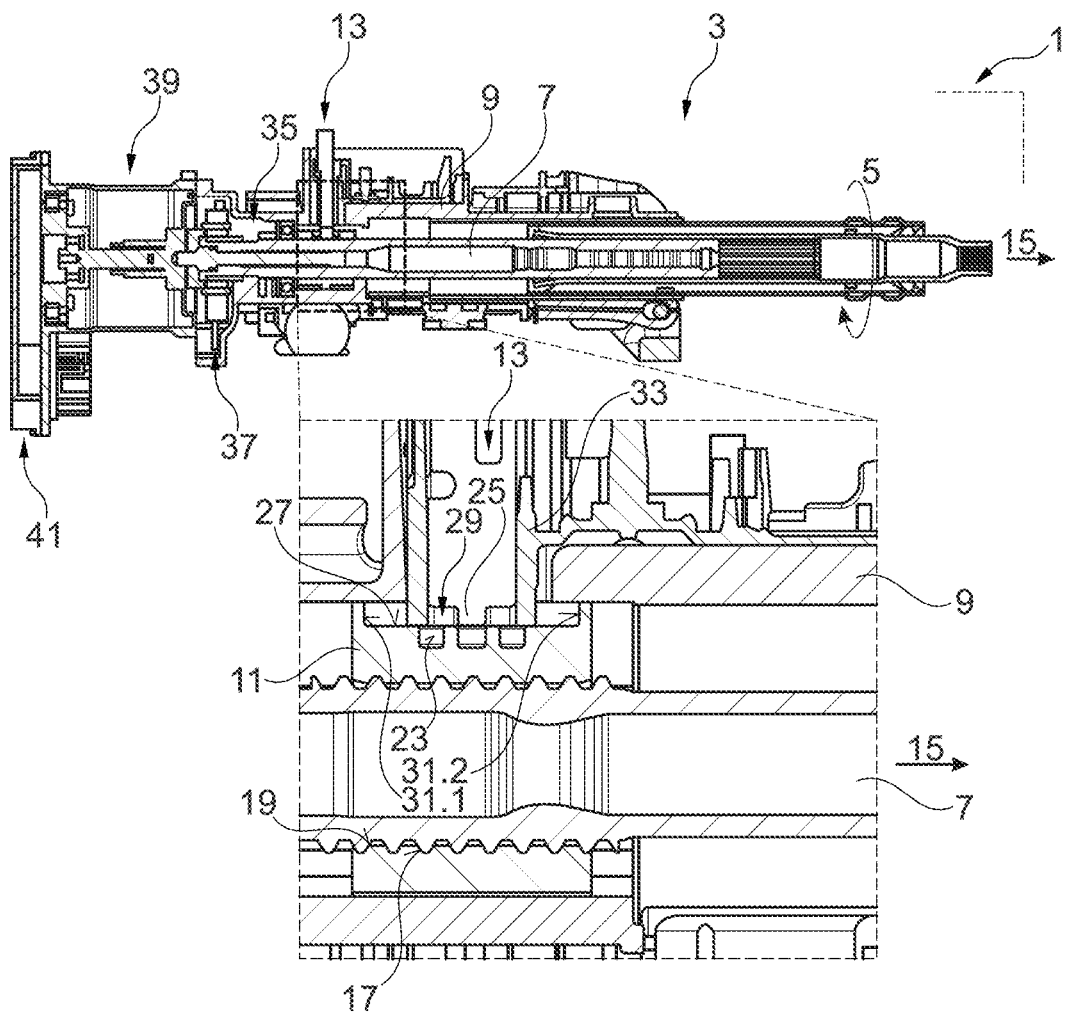
FIG. 1 shows a schematic representation of a first exemplary embodiment of a motor vehicle.

FIG. 1 shows a schematic representation of an exemplary embodiment of a motor vehicle 1 having a steering device 3 which is designed as a steer-by-wire steering device.

The steering device 3 has a steering shaft 7 arranged for rotation in the circumferential direction 5, a casing tube 9 at least partially encompassing the steering shaft 7 in the circumferential direction 5, a sleeve 11 encompassing the steering shaft 7 in the circumferential direction 5, and a locking device 13. The steering shaft 7 is fixed in relation to the casing tube 9 in an axial direction 15 of the steering shaft 7.

The steering shaft 7 has an external thread 17. Particularly preferably, the pitch of the external thread 17 is from 2 mm to 10 mm, particularly preferably 5 mm. The sleeve 11 has an internal thread 19 meshing with the external thread 17. Particularly preferably, the pitch of the internal thread 19 is from 2 mm to 10 mm, particularly preferably 5 mm. Furthermore, the sleeve 11 is form-fitted into the casing tube 9 such that the sleeve 11 can be displaced in relation to the casing tube 9 in the axial direction 15 and is fixed in the circumferential direction 5.

A lateral surface 21—in particular shown in FIGS. 2a and 2b—of the sleeve 11 has at least one recess 23, wherein the locking device 13 and the at least one recess 23 are arranged relative to each other in such a way that the locking device 13 can engage into the at least one recess 23 in at least one axial position of the sleeve 11. Particularly preferably, the locking device 13 has a bolt 25. The bolt 25 is preferably designed to engage into the at least one recess 23.

Preferably, the lateral surface 21 of the sleeve 11 has a plurality of recesses 23, particularly preferably three recesses 23. In the figures, only one recess 23 is provided with a reference sign for the sake of clarity. The locking device 13 and the plurality of recesses 23 are preferably arranged in relation to each other in such a way that the locking device 13 can engage into a recess 23 of the plurality of recesses 23 in at least one axial position of the sleeve 11. Preferably, in each case two recesses 23 of the plurality of recesses 23 are axially spaced apart from each other. Preferably, the bolt 25 is designed to be able to engage into each recess 23 of the plurality of recesses 23.

Preferably, the bolt 25 is pretensioned in a locked state and can be displaced into a released state by means of an actuator, in particular an electric motor, counter to the pretension, which in particular is generated by a spring. In particular, the bolt 25 in FIG. 1 is in the released state, in which the bolt 25 does not engage into a recess 23.

Particularly preferably, the at least one recess 23 is formed in a bottom surface 27 of a cavity 29 of the sleeve 11. The cavity 29 has a first abutment surface 31.1 and a second abutment surface 31.2 in the axial direction 15 of the steering shaft 7.

Preferably, the steering device 3 has a housing 33 encompassing the locking device 13 which engages into the cavity 29 such that the housing 33, in connection with the first abutment surface 31.1 and the second abutment surface 31.2, limits the displacement of the sleeve 11 along the axial direction 15 of the steering shaft 7.

Furthermore, the steering device 3 preferably has a steering sensor 35. The steering sensor 35 is in particular operatively connected to the steering shaft 7 and the locking device 13 and set up to determine a functioning state of the locking device 13. Alternatively or additionally, the steering device 3 preferably has a steering gear 37. Alternatively or additionally, the steering device 3 preferably has a motor 39. Alternatively or additionally, the steering device 3 preferably has a control device 41.

The steering sensor 35 is preferably designed to determine a functioning state of the bolt 25, chosen from the released state, a waiting state and the locked state. The bolt 25 cannot block a rotation of the steering shaft 7 in the released state. Preferably, the bolt 25 is arranged outside of the cavity 29 in the released state. This is not mandatory, however. What is important is that the bolt 25 is held in the released state by the actuator against the pretension. In the waiting state, the bolt 25 is pretensioned in particular against the bottom surface 27 of the cavity 29—and not held by the actuator— to be able to engage into a recess 23 of the at least one recess 23 once it overlaps the recess 23 due to rotation of the steering shaft 7 and displacement of the sleeve 11. In the locked state, the bolt 25 engages into a recess 23 of the at least one recess 23.

In particular, the sleeve 11 is located in a zero-position in relation to the axial direction 15 of the steering shaft 7.

FIGS. 2a and 2b show schematic sectional representations of an exemplary embodiment of the steering device 3.

Identical and functionally identical elements are provided with the same reference signs in all of the figures, such that reference is made to the previous description in each case.

In particular, the steering device 3 is designed according to one or more embodiments from FIG. 1.

Preferably, the sleeve 11 has at least one radial elevation 43 which engages into the casing tube 9 in a form-fitting manner, whereby a rotation of the sleeve 11 in relation to the casing tube 9 is prevented. In particular, the sleeve 11 has a first radial elevation 43.1 and a second radial elevation 43.2. Alternatively or additionally, the radial elevation 43, in particular the first radial elevation 43.1, has the cavity 29.

In FIG. 2a, the bolt 25 engages into a recess 23 of the at least one recess 23. Thus, the bolt 25 is in the locked state, and a rotation of the steering shaft 7 around the axial direction 15 is prevented.

In FIG. 2b, the bolt 25 does not engage into a recess 23 of the at least one recess 23. Therefore, the bolt 25 is either in the released state or in the waiting state.

FIGS. 3a-3d show schematic representations of the exemplary embodiment of the steering device 3 in four positions.

In particular, the steering device 3 is designed according to one or more embodiments from FIG. 1 or FIGS. 2a-2b.

In FIG. 3a, the bolt 25 does not engage into a recess 23 of the at least one recess 23. Therefore, the bolt 25 is either in the released state or in the waiting state. Furthermore, the housing 33 of the locking device 13 abuts against the first abutment surface 31.1 and thus limits the axial displacement of the sleeve 11. Thus, the sleeve 11 is located in a first end position in relation to the axial direction 15 of the steering shaft 7.

In the FIGS. 3b and 3c, the bolt 25 engages into a recess 23 of the at least one recess 23. Thus, the bolt 25 is in the locked state, and a rotation of the steering shaft 7 around the axial direction 15 is prevented. Preferably, the sleeve 11 is displaced between the zero-position from FIG. 1 and the position from FIG. 3b by 6.2 mm counter to the axial direction 15. Furthermore, the sleeve 11 is preferably displaced between the zero-position from FIG. 1 and the position from FIG. 3c by 6.2 mm in the axial direction 15. Alternatively or additionally, the steering shaft 7 is rotated through 440° in or counter to the circumferential direction 5, in order to displace the sleeve 11 from the zero-position into the position from FIG. 3b counter to the axial direction 15. Alternatively or additionally, the steering shaft 7 is rotated through 440° in the other direction, in particular counter to or in the circumferential direction 5, in order to displace the sleeve 11 from the zero-position into the position from FIG. 3c in the axial direction 15. Particularly preferably, the steering shaft 7 and the sleeve 11 are coordinated in such a way that the sleeve 11 is displaced by 6.2 mm in and/or counter to the axial direction 15 upon a rotation of the steering shaft 7 through 440° in and/or counter to the circumferential direction 5 from the zero-position.

In FIG. 3d, the bolt 25 does not engage into a recess 23 of the at least one recess 23. Therefore, the bolt 25 is either in the released state or in the waiting state. Furthermore, the housing 33 of the locking device 13 abuts against the second abutment surface 31.2 and thus limits the axial displacement of the sleeve 11. Thus, the sleeve 11 is located in a second end position in relation to the axial direction 15 of the steering shaft 7.

Preferably, the sleeve 11 is displaced by 6.7 mm counter to the axial direction 15 between the zero-position from FIG. 1 and the position from FIG. 3a. Furthermore, the sleeve 11 is preferably displaced by 6.7 mm in the axial direction 15 between the zero-position from FIG. 1 and the position from FIG. 3d. Alternatively or additionally, the steering shaft 7 is rotated through 480° in or counter to the circumferential direction 5, in order to displace the sleeve 11 from the zero-position into the position from FIG. 3a counter to the axial direction 15. Alternatively or additionally, the steering shaft 7 is rotated through 480° in the other direction, in particular counter to or in the circumferential direction 5, in order to displace the sleeve 11 from the zero-position into the position from FIG. 3d in the axial direction 15. Particularly preferably, the steering shaft 7 and the sleeve 11 are coordinated in such a way that the sleeve 11 is displaced by 6.7 mm in and/or counter to the axial direction 15 upon rotation of the steering shaft 7 through 480° in and/or counter to the circumferential direction 5 from the zero-position.

Figure 4:
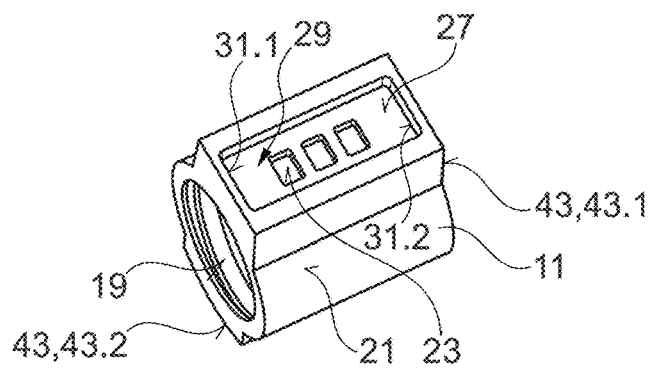
FIG. 4 shows a schematic representation of an exemplary embodiment of a sleeve.

FIG. 4 shows a schematic representation of an exemplary embodiment of the sleeve 11.

Figure 2:
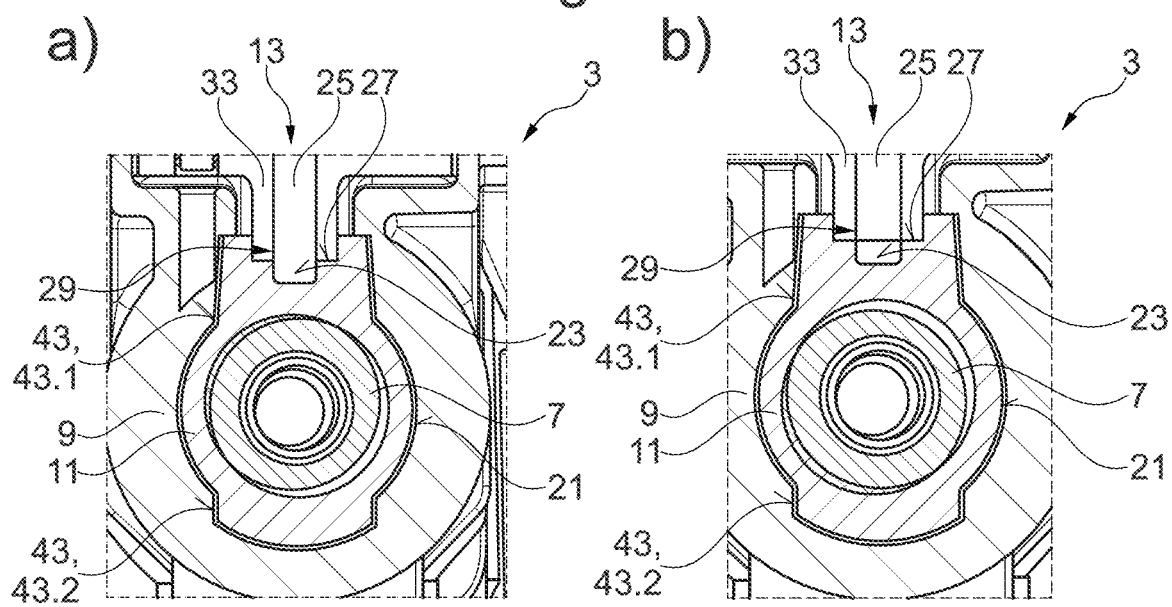
FIGS. 2a and 2b show schematic sectional representations of an exemplary embodiment of a steering device.
Figure 3:
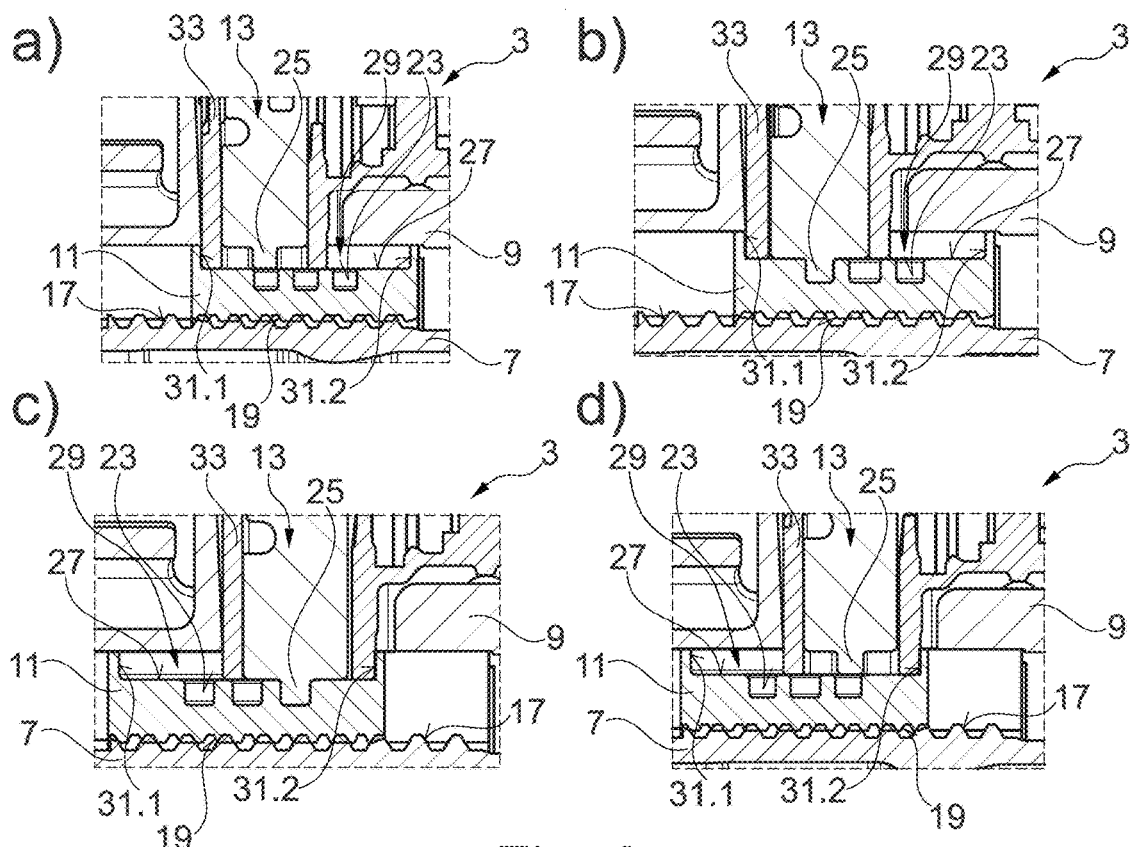
FIGS. 3a-3d show schematic representations of the exemplary embodiment of the steering device in four positions.

In particular, the sleeve 11 is designed according to one or more embodiments from FIGS. 1 to 3.

Preferably, at least two recesses 23 of the plurality of recesses 23 are identical. Alternatively or additionally, the cavity 29 is rectangular.

Figure 5:
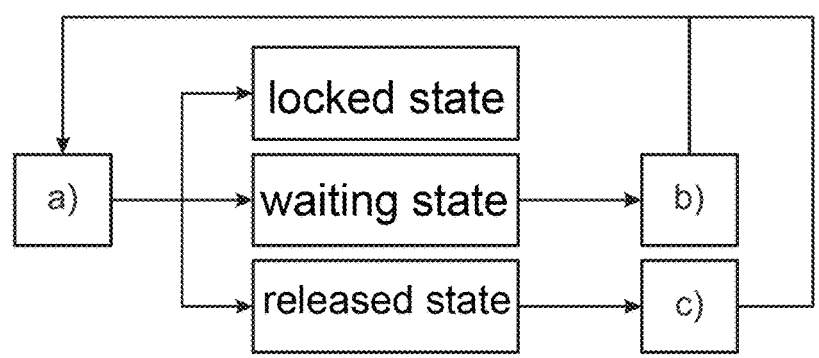
FIG. 5 shows a flow chart of an exemplary embodiment of a method for operating the steering device.

FIG. 5 shows a flow chart of an exemplary embodiment of a method for operating the steering device 3.

In particular, the steering device 3 has the steering sensor 35 which is operatively connected to the steering shaft 7 and the locking device 13. Preferably, the steering sensor 35 is set up to determine an operating state of the actuator and a displacement distance of the bolt 25 of the locking device 13, in particular in relation to the housing 33.

Preferably, the method is carried out by means of the control device 41, wherein the control device 41 is operatively connected in particular to the steering sensor 35, the steering shaft 7 and the locking device 13 and is set up for their respective control.

In a first step a), a functioning state of the bolt 25, chosen from the released state, the waiting state and the locked state, is determined by means of the steering sensor 35. Particularly preferably, the functioning state of the bolt 25 is determined when a drive device of the motor vehicle 1 having the steering device 3 is deactivated.

In particular, the bolt 25 is in the released state if the actuator which displaces the bolt 25 counter to the pretension is activated. The bolt 25 is in particular in the locked state or the waiting state if the actuator is not activated. If the actuator is deactivated and the displacement distance of the bolt 25 is greater than a predetermined threshold displacement, the bolt 25 is in particular in the locked state. If the actuator is deactivated and the displacement distance of the bolt 25 is less than or equal to a predetermined threshold displacement, the bolt 25 is in particular in the waiting state.

If the bolt 25 is in the locked state, the method ends after the first step a).

If the bolt 25 is in the waiting state, in a second step b) the steering shaft 7 is rotated—in particular automatically by the motor 39—until the bolt 25 is pushed into the locked state, in particular by the pretension. In particular, after a rotation of the steering shaft 7 through a predetermined rotation angle, the functioning state of the bolt 25 is checked by repeating the first step a).

If the bolt 25 is in the released state and in particular if the drive device is deactivated, the actuator is deactivated in an optional third step c) in order to transfer the bolt 25 into the locked state or the waiting state. After the third step c), the first step a) in particular is repeated.

In particular, when the drive device is deactivated, the steps a) to b) are carried out until the bolt 25 is in the locked state.

The invention claimed is:

1. A steering device (3) which is configured as a steer-by-wire steering device, comprising:
    a steering shaft (7) disposed for rotation in a circumferential direction (5);
    a casing tube (9) at least partially encompassing the steering shaft (7) in the circumferential direction (5), wherein the steering shaft (7) is fixed in relation to the casing tube (9) in an axial direction (15) of the steering shaft (7);

a sleeve (11) encompassing the steering shaft (7) in the circumferential direction (5); and a locking device (13);

wherein the steering shaft (7) has an external thread (17) which meshes with an internal thread (19) of the sleeve (11);

wherein the sleeve (11) is form-fitted into the casing tube (9) such that the sleeve (11) is displaceable in relation to the casing tube (9) in the axial direction (15) and is fixed in the circumferential direction (5);

wherein a lateral surface (21) of the sleeve (11) has at least one recess (23);

wherein the locking device (13) and the at least one recess (23) are disposed in relation to each other such that the locking device (13) is engageable into the at least one recess (23) in at least one axial position of the sleeve (11);

wherein the locking device (13) has a bolt (25), wherein the bolt (25) engages into the at least one recess (23) in a locked state of the bolt (23), and wherein a rotation of the steering shaft (7) around the axial direction (15) of the steering shaft (7) is prevented in the locked state of the bolt (23).

2. The steering device (3) according to claim 1, wherein the sleeve (11) is displaceable between a first end position and a second end position in the axial direction (15) of the steering shaft (7).

3. The steering device (3) according to claim 1, wherein the at least one recess (23) is formed in a bottom surface (27) of a cavity (29) of the sleeve (11), wherein the cavity (29) has a first abutment surface (31.1) and a second abutment surface (31.2) in the axial direction (15) of the steering shaft (7), wherein a housing (33) encompassing the locking device (13) engages into the cavity (29) such that the housing (33), in connection with the first abutment surface (31.1) and the second abutment surface (31.2), limits a displacement of the sleeve (11) along the axial direction (15) of the steering shaft (7).

4. The steering device (3) according to claim 3, wherein the sleeve (11) engages into the casing tube (9) in a form-fitting manner via at least one radial elevation (43) and wherein the at least one radial elevation (43) has the cavity (29).

5. The steering device (3) according to claim 1, wherein the bolt (25) of the locking device (13) is pretensioned into the locked state and is displaceable into a released state by an actuator counter to the pretension.

6. The steering device (3) according to claim 1, wherein the sleeve (11) engages into the casing tube (9) in a form-fitting manner via at least one radial elevation (43).

7. The steering device (3) according to claim 1, further comprising a steering sensor (35), wherein a functioning state of the bolt (25) is determinable by the steering sensor (35), wherein the functioning state includes a released state, a waiting state, and the locked state, wherein the bolt (25) cannot block a rotation of the steering shaft (7) in the released state, and wherein the bolt (25) is pretensioned in the waiting state, in order to engage into the at least one recess (23).

8. A motor vehicle (1), comprising:

the steering device (3) according to claim 1, wherein the rotation of the steering shaft (7) around the axial direction (15) of the steering shaft (7) is prevented in the locked state of the bolt (23) in a parking position of the motor vehicle (1).

9. A method for operating the steering device (3) according to claim 7, wherein the steering sensor (35) is operatively connected to the steering shaft (7) and the locking device (13), comprising the steps of:

determining the functioning state of the bolt (25) by the steering sensor (35) and, when the bolt (25) is in the waiting state, rotating the steering shaft (7) until the bolt (25) is pushed into the locked state.

* * * * *